US010860343B2

(12) United States Patent
Sellers-Blais (10) Patent No.: US 10,860,343 B2
(45) Date of Patent: Dec. 8, 2020

(54) METHOD FOR CONCURRENT MULTIUSER EPISTEMOLOGICAL COLLABORATION

(71) Applicant: IFWIZARD Corporation, Coeur d'Alene, ID (US)

(72) Inventor: Dominic Samuel Sellers-Blais, Coeur d'Alene, ID (US)

(73) Assignee: IFWIZARD CORPORATION, Coeur D'Alene, ID (US)

( * ) Notice: Subject to any disclaimer, the term of this patent is extended or adjusted under 35 U.S.C. 154(b) by 960 days.

(21) Appl. No.: 15/442,409

(22) Filed: Feb. 24, 2017

(65) Prior Publication Data

US 2017/0249553 A1 Aug. 31, 2017

Related U.S. Application Data

(60) Provisional application No. 62/301,432, filed on Feb. 29, 2016.

(51) Int. Cl.
*G06F 9/451* (2018.01)
*G06N 5/02* (2006.01)
*G06Q 10/10* (2012.01)

(52) U.S. Cl.
CPC .............. *G06F 9/452* (2018.02); *G06N 5/022* (2013.01); *G06Q 10/101* (2013.01)

(58) Field of Classification Search
CPC ......... G06F 9/452; G06F 9/451; G06N 5/022; G06N 5/02; G06Q 10/101; G06Q 10/10
See application file for complete search history.

(56) References Cited

U.S. PATENT DOCUMENTS

| 2009/0240564 A1* | 9/2009 | Boerries | G06Q 30/0255 709/204 |
| 2017/0061093 A1* | 3/2017 | Amarasingham | G16H 50/30 |
| 2017/0228635 A1* | 8/2017 | Diev | G06N 3/08 |

* cited by examiner

*Primary Examiner* — Li Wu Chang
(74) *Attorney, Agent, or Firm* — Fisherbroyles, LLP; Micah D. Stolowitz (57) ABSTRACT

An application program, system and methods are configured to implement concurrent multiuser epistemological collaboration, that is, collaborative development of a digital knowledge model based on at least one epistemological "experience," which is stored as a structured data entity containing information that can be personally perceived (typically viewed, read, observed) by multiple concurrent users of the application over a network. The users develop the digital knowledge model, by way of GIU interactions, comprising assertion entities and belief entities based on the experience and/or selected portions of the experience defined by focus entities; wherein each set of assertion entities is related as a child of a corresponding individual experience of the set of experience entities; and each set of belief entities is related as a child of a corresponding individual assertion of the set of assertion entities.

5 Claims, 14 Drawing Sheets

101 — EXPERIENCE

Full text of Dr. Lambe's *Water and Vegetable Diet in Consumption, Scrofula, Cancer, Asthma, and Other Chronic Diseases*

102 — FOCUS

Span of pages 89 through 90

101 — EXPERIENCE

"My reason for objecting to every species of matter to be used as food, except the direct produce of the earth...is founded on the broad ground that no other matter is suited to the organs of man."

105 — ASSERTION

"Only plants are healthy food for humans."

107 — BELIEF

50% agreement, 50% confidence
"Our digestive and dental systems do seem more suited for plants."

USERS
- kim
- dom

Model ▼ | Assertion Set ▼ | Belief Set ▼ | ⊕ Experience

1303

Experience menu:
- Text
- Image
- Audio
- Video
- File
- Website
- Map
- 3D
- Location
- Timeline
- Expert System Diet in Disease (1815) - Dr La...

Span → Reason for Veganism. → Only plants are h... → Agree

1304 kim: Supposedly, but it seem like the scientific consensus about foods (e.g. coconut oil or red wine) changes frequently.
dom: Hmm.. maybe something that increases their health? Lots of plant foods are supposed to be good for us.
kim: What do you think it means for a food to be "healthy" anyway?

Enter message...

1302

---

Text Experience

1300

SPAN FOCUS

Parent: [Text Experience (Diet in Di]
Start: [89.0]
End: [90.0]

Title: [Reason for Veganism]
Creator: [dom]
Created By: [2016-01-14 07:58:59.3290]

My reason for objecting to every species of matter to be used as food, except the direct produce of the earth - as maybe seen in my last publication - is founded on the broad ground that no other matter is suited to the organs of man. This applies then with the same force to eggs, milk, cheese, and fish, as to flesh meat.

New Focus Details

Focus Experience *: [Text ▼]
Focus Kind *: [Topic ▼]
Topic *: [          ]

[Create Focus]

[New Assertion]  [Delete Experience]

METHOD FOR CONCURRENT MULTIUSER EPISTEMOLOGICAL COLLABORATION

PRIORITY

This application is a non-provisional of, and claims priority to U.S. provisional application Ser. No. 62/301,432, filed Feb. 29, 2016, incorporated herein by this reference in its entirety.

COPYRIGHT NOTICE

© 2017 IFWIZARD CORPORATION. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

Computerized education technology, and more specifically computer-implemented systems and methods for epistemological modeling based on concurrent, multiuser interactions and data structures in support thereof.

BACKGROUND

Philosophy has examined the nature of knowledge and truth since its historical beginnings, with prominent philosophers advancing a great variety of epistemological models. While the field of logic has attracted considerable consensus in its development, given the inherent importance of verifiability and consistency, especially with regards to deductive logic, epistemology is far more divergent. No single epistemological model has emerged to represent the majority of philosophers or lay persons' view. Relatedly, the simple question of "what is truth?" has eluded consensus, with a multitude of popular definitions.

Modern conventional education typically seeks to produce, in addition to skills, conformance in the learner's knowledge to that of some predetermined set, i.e. the mastery of a curriculum. Thus, considerable research into educational theory has been concerned with improvements in this transference of knowledge and the application of computer-based conditioning techniques such as through "gamification" has enjoyed popularity in the search of more efficient knowledge transfer.

However, another potential goal of education is to encourage a more personal discovery of truth. This more pluralistic approach certainly may incorporate discovery of other's views, potentially enriching and broadening the perspective of learners. With such goals, computerized education technology which have conditioning towards only a singular outcome, e.g. only a singular truth or perspective, fall short of this more exploratory goal.

Extant technology that is perhaps more appropriate to this endeavor includes general purpose creative tools such as outlining, mind mapping, argument mapping, and deductive programming environments. However, these tools are very rarely designed with a multitenant use case in mind. And, in the case of logical or rhetorical aides, typically presume a single model of truth. In particular, the explicit element of personal belief is lacking, as the existing tools presume an implicit confidence in the models that they create.

Furthermore, there is typically the presumption of adherence to a particular epistemological system, rather than a more open ended architecture that can encompass most of the varieties of epistemological philosophy. This constraint is understandable given the tools typical functional purpose, rather than as a more purely exploratory purpose, but is a critical limitation of the utility of such a tool while permitting diverse views of truth and knowledge.

Given these limitations and constraints, the divergence in individual philosophies on truth and knowledge, and the general trend in education towards more testable conditioning rather than open minded exploration, there is a gap in the available technology. No existing environment or product is designed for concurrent structured exploration of multiple learner perspectives in such a way that the personal conception of fact and faith are present, whether as model creator or critic.

SUMMARY OF THE DISCLOSURE

The following is a summary of the present disclosure in order to provide a basic understanding of some features and context. This summary is not intended to identify key/critical elements of the invention or to delineate the scope of the invention. Its sole purpose is to present some concepts of the present disclosure in a simplified form as a prelude to the more detailed description that is presented later.

Accordingly, it is an object of the present disclosure to provide a system, method and data structures for multiple human users to simultaneously articulate, explore, and critically examine their own and each other's views and beliefs in a graphical user interface of a computer system. It is a further object of the disclosure that this epistemological exploration be originated ultimately from phenomenological experiences which may be reproduced exactly and consistently for any and all users, providing a common object of study about which views may be formed. This exploration may be further structured through virtual windows of focus descending from a parent experience to a child experience, such as, in some embodiments, an article to its footnotes, a visual film to a specific scene, or an interview to its topic questions.

It is also an object of the present disclosure to offer within this method a generic structure for separating the objective, unqualified experiences from subjective assertions about these experiences and, further, to separate personal beliefs about these assertions from the assertions themselves with the intention to permit a plurality of beliefs about assertion statements. These assertions and beliefs may be contained within assertion sets and belief sets respectively, to group analyses and personal beliefs into collections potentially matched to specific users, modes of thought, or other classifications.

Another feature of the present disclosure comprises a complete method and system for a server-client networked configuration to provide the collaborative encounter between multiple users through a communication bus, journaling change logger, and data object storage and retrieval in such a way that the encounter is provided with reliable resource efficiency, timely updates, and data consistency across a variety of nondeterministic and asynchronous clients.

In some embodiments, our invention utilizes some common components of real-time collaboration such as chat in a non-essential way. The core of this disclosure, however, is the collective construction and examination of knowledge models and the assertions/beliefs around them, as enabled by suitable computer resources including a database. While any textual/lingual computer data (e.g. a Wiki page) can theoretically represent human knowledge, the structure and constraints we impose are unique, especially in that they do not presume to make an absolute logic diagram.

This is of especial significance because for example, a Wiki Page provides a single canonical representation of knowledge/truth (even if within that representation multiple views or "sides" are presented). Our structure completely ignores the question of what is ultimately true and encourages personal exploration of our models and beliefs rather than conditioning towards a single authoritative understanding. This is what makes it special, which is quite apart from what almost all educational software is focused on, i.e. "mastery"—meaning memorization of that single authoritative understanding.

The invention is intended to be implemented in software; i.e., in one or more computer programs, routines, functions or the like. Thus it may best be utilized on a machine such as a computer or other device that has at least one processor and access to memory, as further described later. Accordingly, in this description, we will sometimes use terms like "component," "subsystem," "entity," "interface," or the like, each of which would be implemented in software. We also refer to "properties" of an entity; it should be recalled that typically a single property of an entity consists of a field-value pair.

In a preferred system, computing assets are configured to provide the collaborative encounter between multiple users through a communication bus, journaling change logger, and data object storage and retrieval in such a way that the encounter is provided with reliable resource efficiency, timely updates, and data consistency across a variety of nondeterministic and asynchronous clients. An example arrangement is illustrated in FIGS. 11-14. Manual or "pencil and paper" solutions are not feasible for providing these characteristics in any useful way. To take just one example, it would be impossible to manually "rewind" an interactive session to identify how one user's perception affected another user's view of the same objective experience; or, assess how a specific temporal sequence of interactions influenced the evolving model.

BRIEF DESCRIPTION OF THE DRAWINGS

In order to describe the manner in which the above-recited and other advantages and features of the disclosure can be obtained, a more particular description follows by reference to the specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF PREFERRED EMBODIMENTS

The following detailed description refers to the accompanying drawings. Wherever possible, the same reference numbers are used in the drawings and the following description to refer to the same or similar elements. For clarity and simplicity, not all characteristics of practical embodiments are described in the specification. However, it is appreciated that many embodiment-specific decisions have to be made in developing the practical embodiments in order to achieve a particular object of the developer. While embodiments of the invention may be described, a person skilled in the relevant art would recognize that modifications, adaptations, and other implementations are possible without parting from the spirit and scope of the invention. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, proper scope of the invention is defined by the appended claims.

Figure 1:
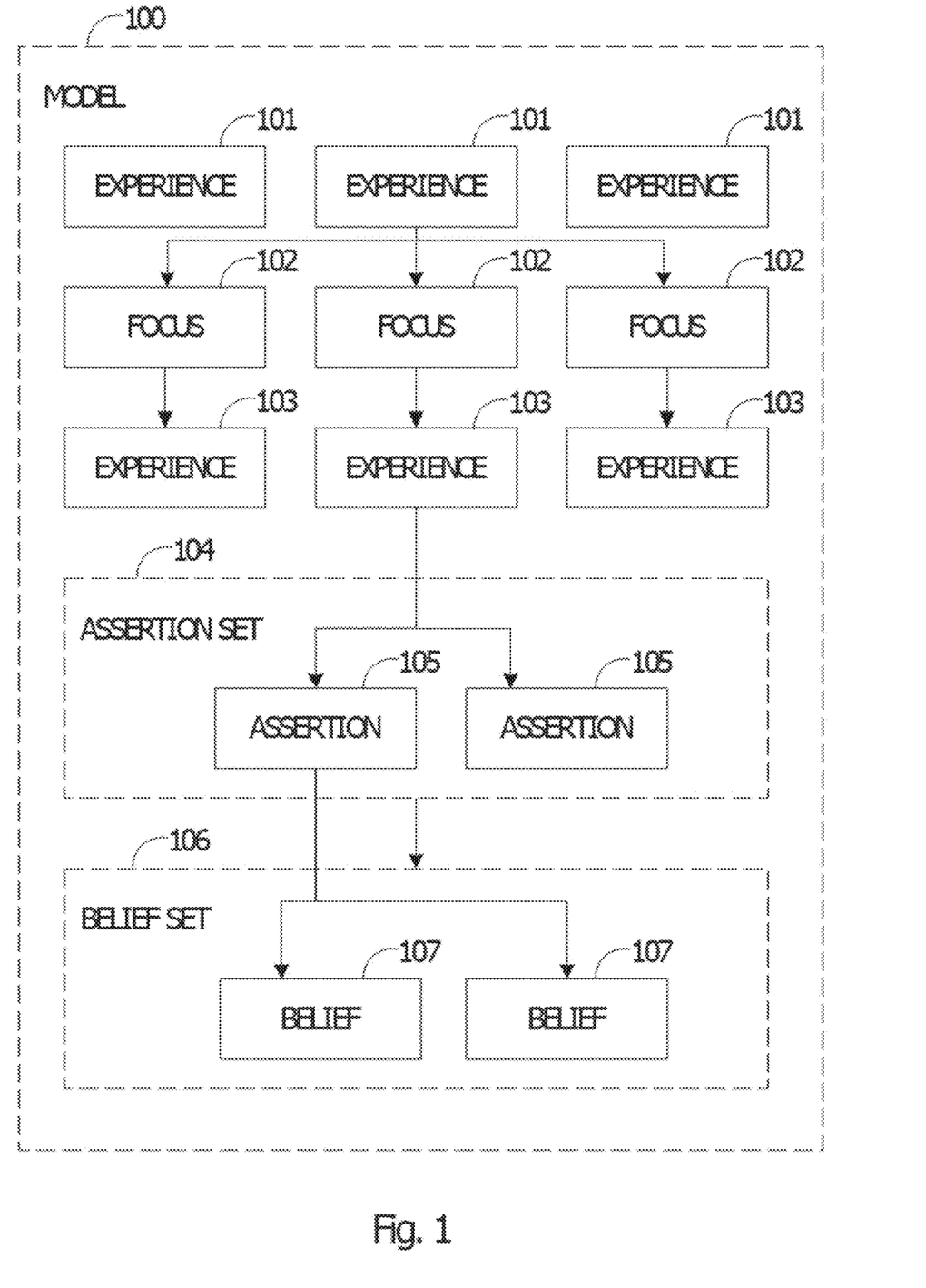
FIG. 1 is a conceptual diagram of the principal functional components of an illustrative knowledge model consistent with the present disclosure.

FIG. 1 illustrates the functional components of a knowledge belief model 100. These components may be represented and stored as machine-readable data entities. For example, assertion entities and belief entities are described in more detail later with regard to FIG. 12. The model 100 contains a set of consistent perceptual experiences 101. Again, each experience is realized as a data entity, which may take any appropriate machine accessible form. These experiences 101 may have a set of dependent experiences 103 whose connection is defined by a single focus 102 defining the scope of connection. The model 100 contains at least one assertion set 104 with which are associated assertions 105, each containing a propositional statement. Any root experience 101 or dependent experience 103 may have one or more assertions 105, varying according to a given set of assertions 104. Each assertion may have one or more beliefs 107 describing the nature of trust in the assertion 104 according to a specific belief set 106, of which the model 100 contains at least one.

Figure 2:
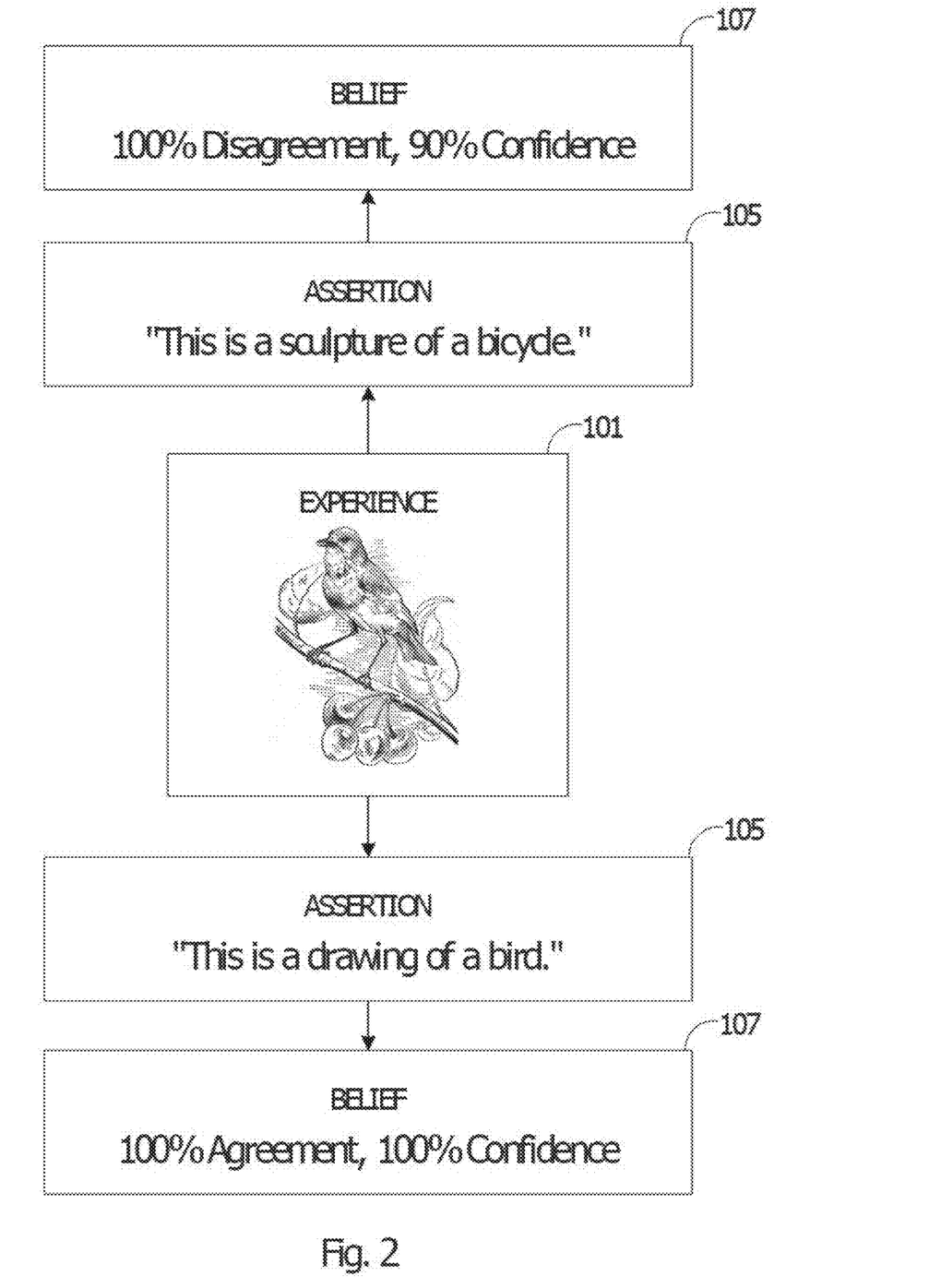
FIG. 2 illustrates components of an example of an experience-assertion-belief sequence.

FIG. 2 illustrates an example experience-assertion-belief sequence. In this example, the raw perceptual experience 101 is a drawing of a bird and it has two assertions 105 connected to it, one stating that the experience 101 is a "sculpture of a bicycle" and the other stating it is a "drawing of a bird". These assertions 105, in turn, each have a belief connected to them demonstrating 100% disagreement/90% confidence and 100% agreement/100% confidence respectively. To be clear, in this document, we frequently refer to "experience," "assertion," etc. to mean not the literal thing, but rather as a shorthand to refer to a corresponding machine-readable data entity that represents the thing. This style, common in computer science, is used to reduce redundancy and improve readability.

Figure 3:
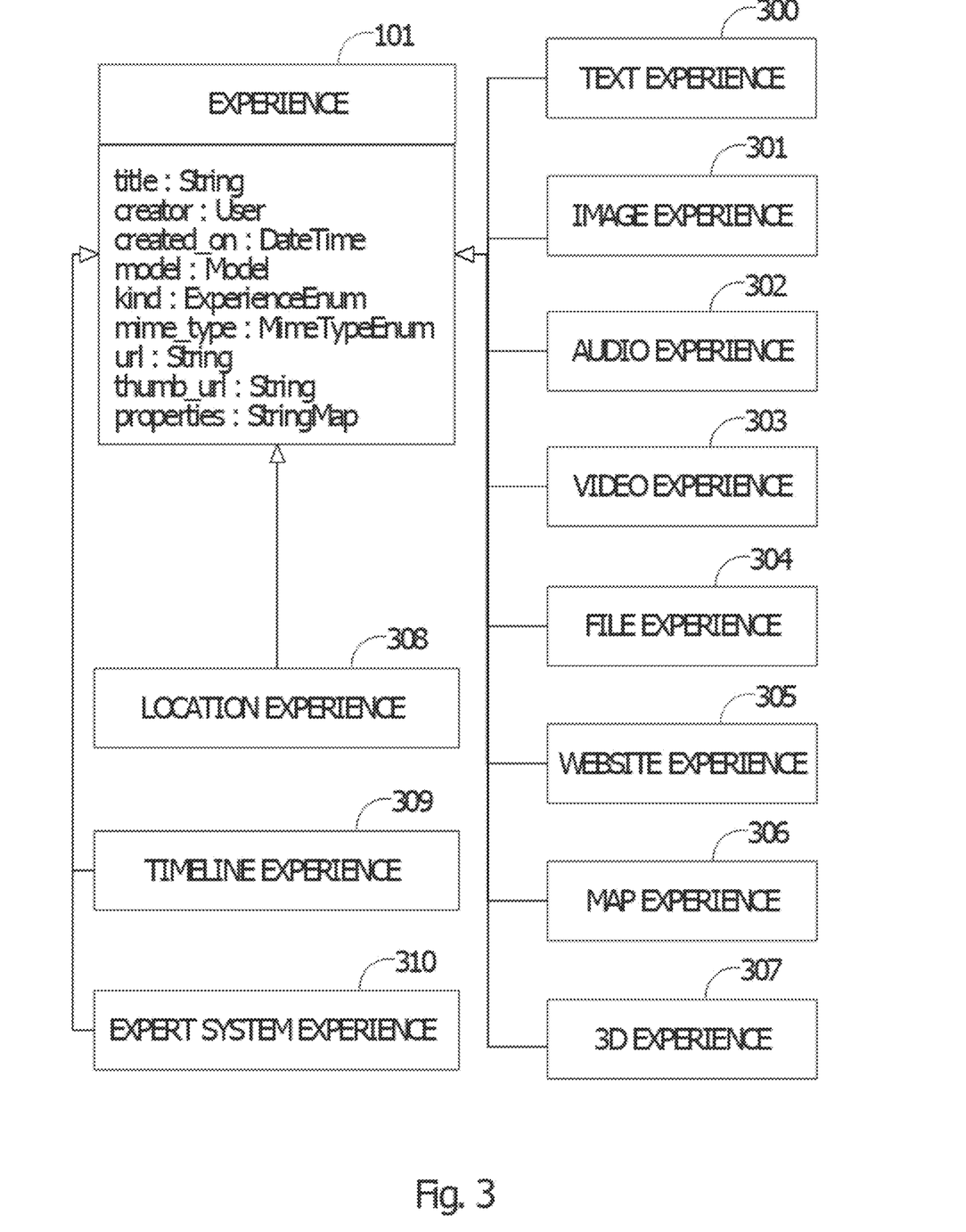
FIG. 3 illustrates examples of properties of an experience entity and example derivative experience formats.

FIG. 3 illustrates an example of properties of an experience entity 101 and various derivative experience formats, each of which inherits the properties of the stereotypical experience type 101. The properties of an experience 101 may include, for example, its title, creating user, creation date and time, model, format kind, MIME (Multipurpose Internet Mail Extension) type, perceptual content URL (Uniform Resource Locator), "thumbnail" image URL for previewing the content, and a key-value mapping generic properties list. The last element enables arbitrary key-value pairs suited to any specific type of experience, without limitation to those listed above or now known. In this way, the arbitrary key-value pairs are a "future-proofing" to allow very generic adaption to different uses. In simple terms, an experience will often take the form of what is commonly called "digital content." It must be presented to all users of the system in a consistent, objective way. An experience is something which may be perceived and considered on its own (though there may be benefits to considering the parent context). A single frame of video within a movie is an experience, derivative of the parent experience, the movie. In this example, a derivative of an experience is akin to a subset. Within that frame of video, a close up of someone's face could be a further derivative experience, with the frame as parent and movie as grandparent. A focus (further described below) is the mapping between the child and parent experience (i.e. "03:22:01" as movie frame location).

Example derivative experience subclass formats may include a text experience 300 which reference a single block of textual characters, image experience 301 which references a single flat bitmap or vector image, audio experience 302 which references a single continuous auditory recording, video experiences 303 which references a single continuous video recording, file experience 304 which references a single computerized file of any type, website experience 305 which references a single network URL such as for an Internet website, map experience 306 which references a two-dimensional map, 3D experience 307 which references a three-dimensional space or model, location experience 308 which references a geographical location point, timeline experience 309 which references a chronological event listing, and an expert system experience 310 which references an interactive knowledgebase.

Figure 4:
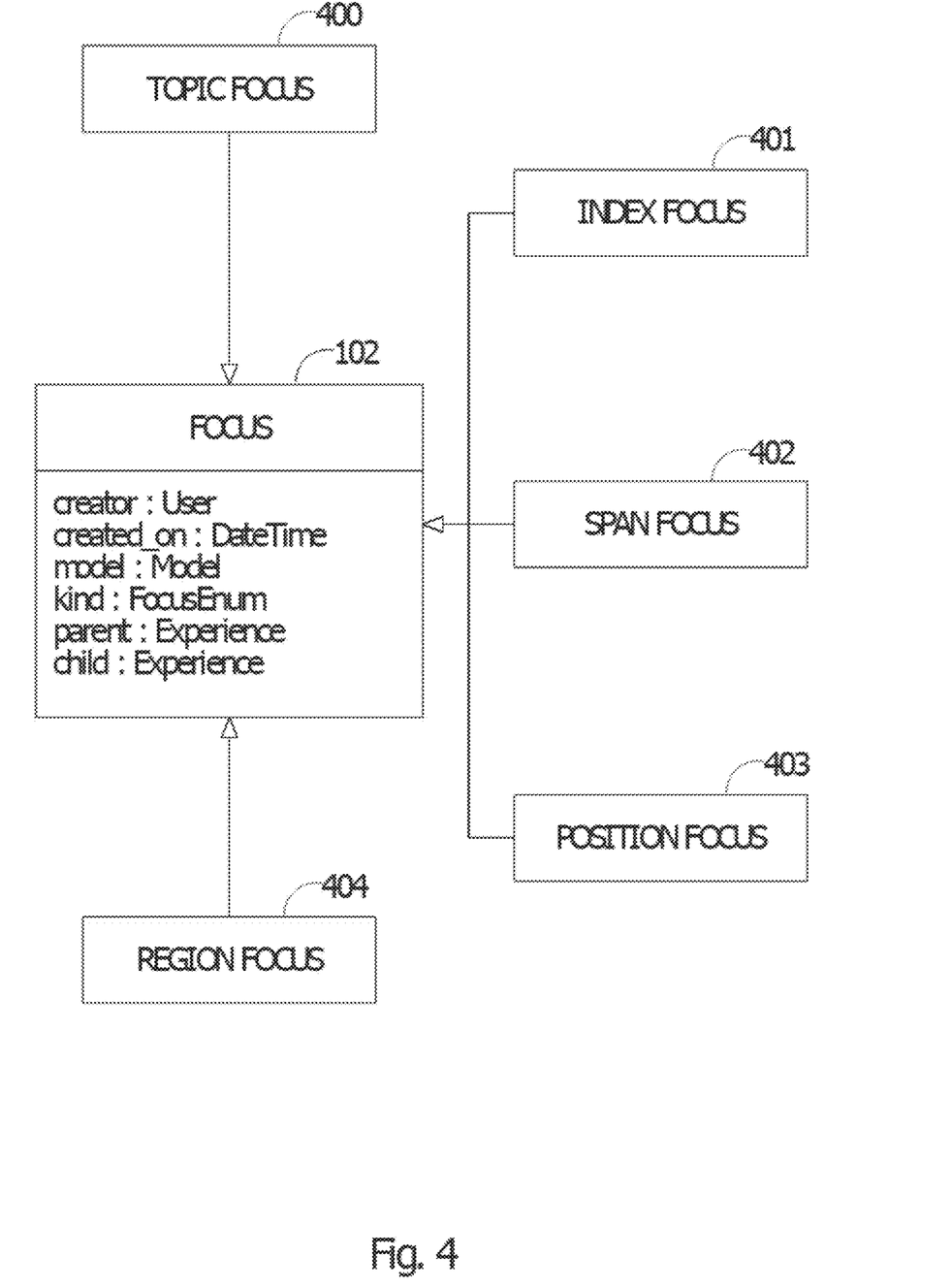
FIG. 4 illustrates example properties of a focus entity and example derivative focus formats.

FIG. 4 illustrates the properties of a focus 102 and some examples of derivative focus formats, all of which inherit the properties of the stereotypical focus type 102. The properties of a focus 102 may include its creating user, creation date and time, model, format kind, originating parent experience, and dependent child experience. These are a necessary minimum set of properties. They may be stored differently from the arbitrary pairs because they have special constraints on their values (e.g., a "dependent child experience" must map to a child experience's ID). Example derivative focus subclass formats may include a topic focus 400 which represents a single textual topic or question of the parent experience 101, an index focus 401 which represents a single real number index or linear position within the parent experience 101, a span focus 402 which represents a real number start and end linear positions within the parent experience 101, a position focus 403 which represents a two or three dimensional real number position within the parent experience 101, and a region focus 404 which represents a two or three dimensional region as a series of two or three dimensional real number positions (points) mapping a manifold surface through its maximum closed extents.

Figure 5:
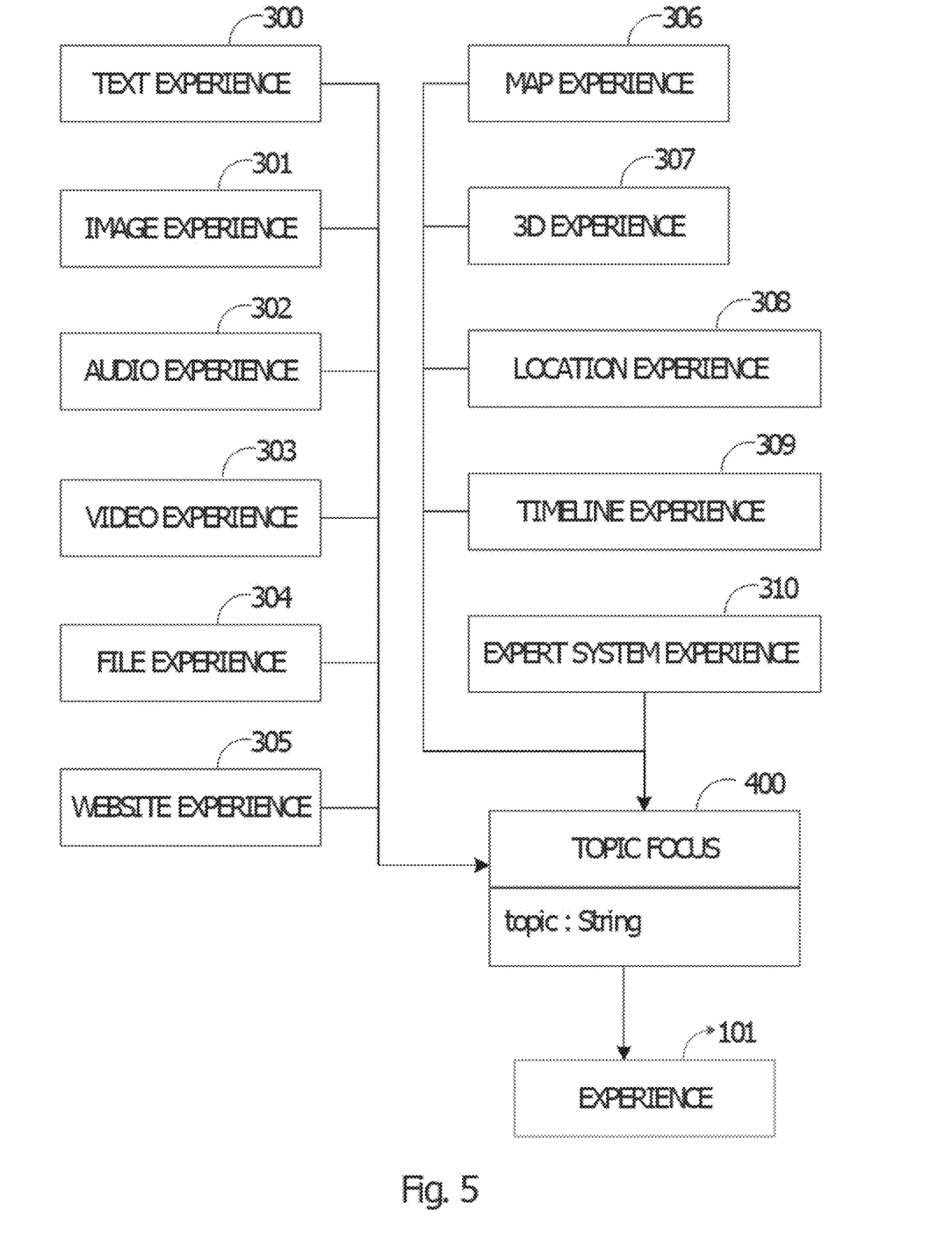
FIG. 5 illustrates example properties of a topic focus and its permissible parent experience formats.

FIG. 5 illustrates the properties of a topic focus 400 as a single textual topic or question with its permissible parent experience formats including text experiences 300, image experiences 301, audio experiences 302, video experiences 303, file experiences 304, website experiences 305, map experiences 306, 3D experiences 307, location experiences 308, timeline experiences 309, and expert system experiences 310. A topic focus's 400 permissible child experience 101 may be of any format.

Figure 6:
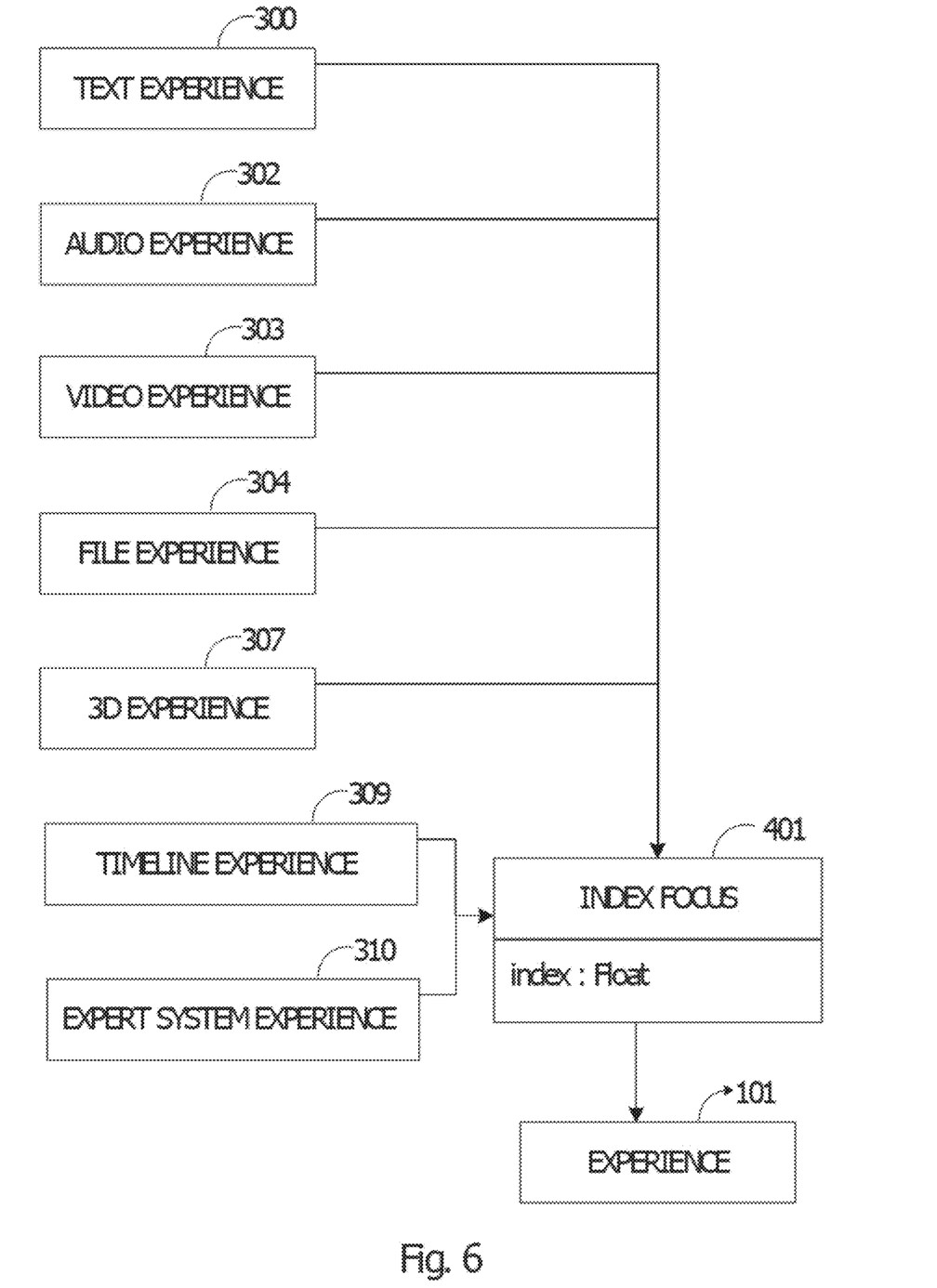
FIG. 6 illustrates example properties of an index focus and its permissible parent experience formats.

FIG. 6 illustrates the properties of an index focus 401 as a single real number index in the linear extents of its parent experience 101 with its permissible parent experience formats including text experiences 300, audio experiences 302, video experiences 303, file experiences 304, 3D experiences 307, timeline experiences 309, and expert system experiences 310. An index focus's 401 permissible child experience 101 may be of any format.

Figure 7:
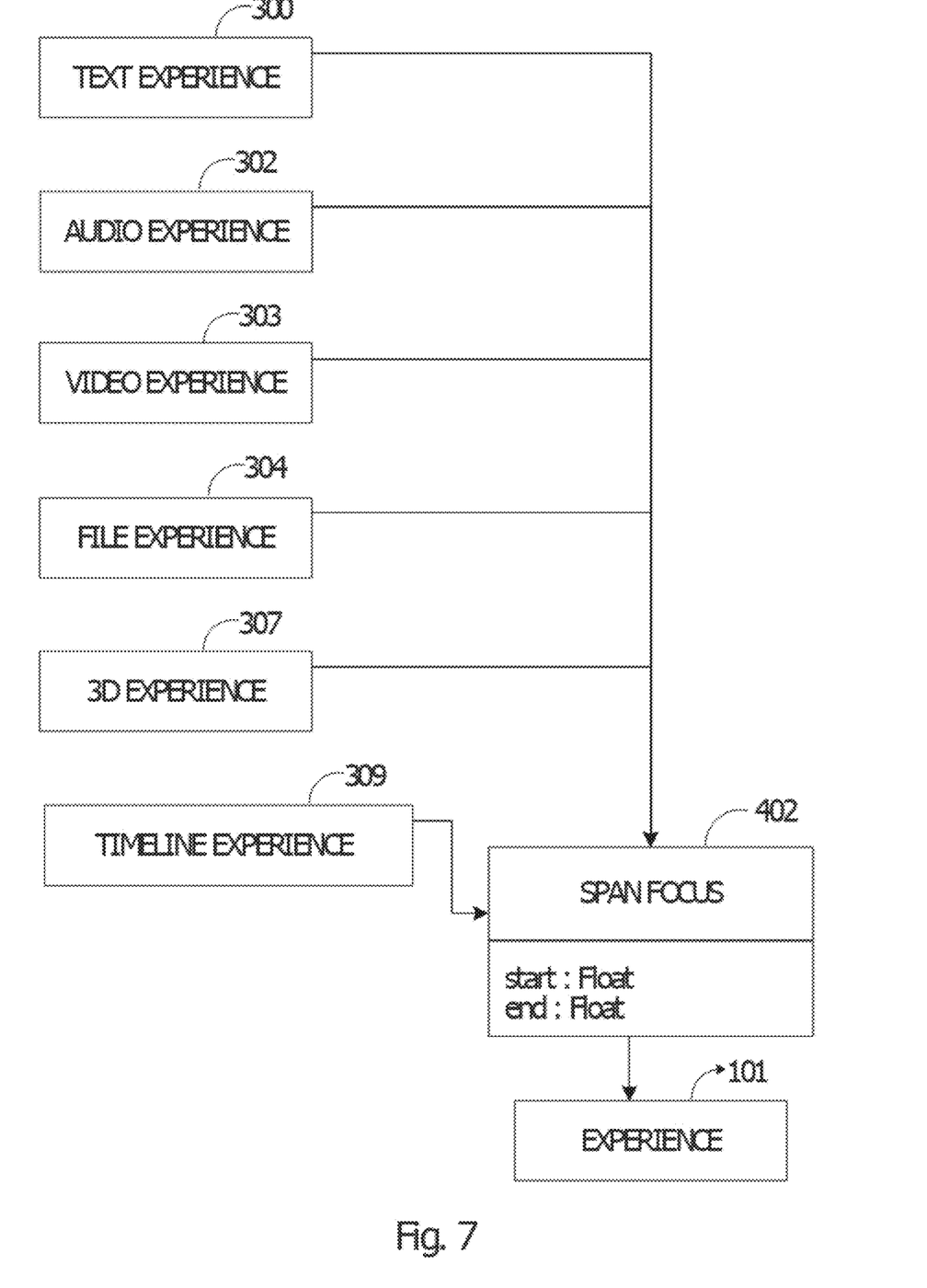
FIG. 7 illustrates example properties of a span focus and its permissible parent experience formats.

FIG. 7 illustrates the properties of a span focus 402 as a real number start and end indices within the parent experience 101 space with its permissible parent experience formats including text experiences 300, audio experiences 302, video experiences 303, file experiences 304, 3D experiences 307, and timeline experiences 309. A span focus's 402 permissible child experience 101 may be of any format.

Figure 8:
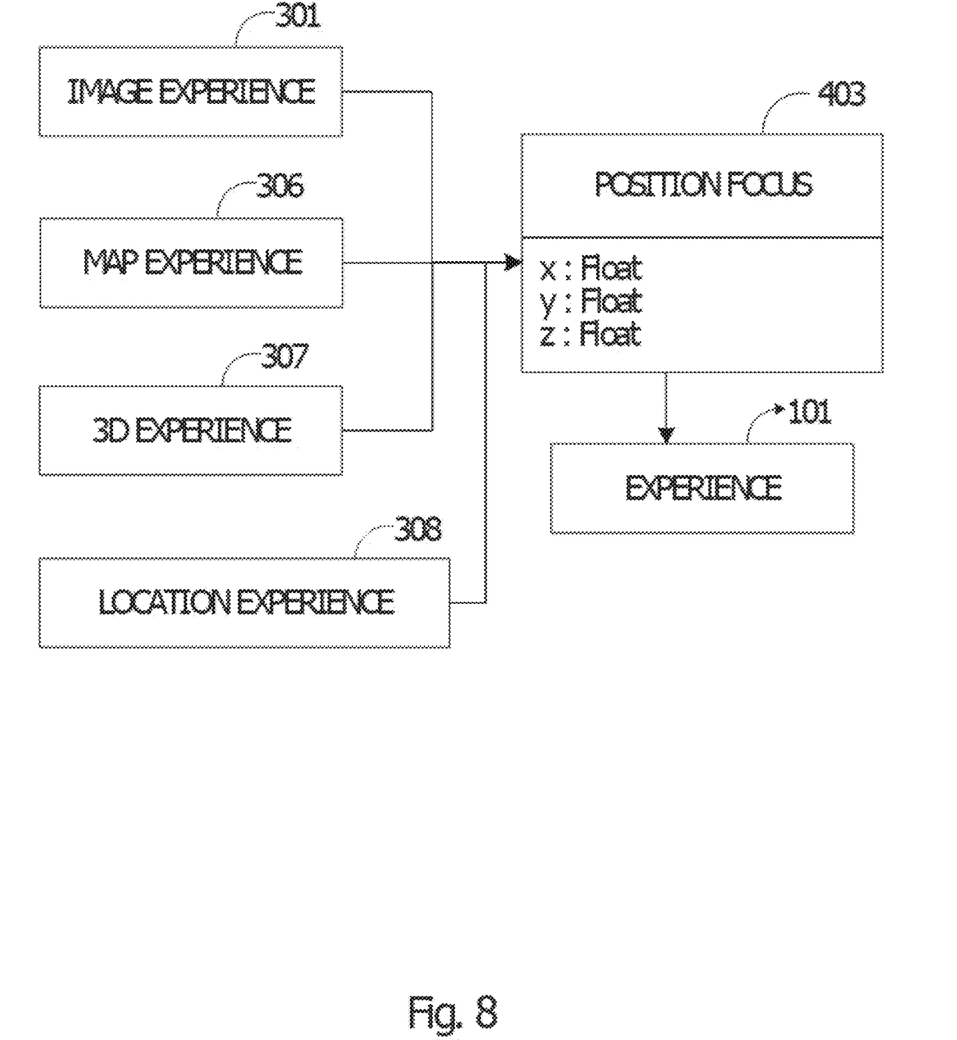
FIG. 8 illustrates example properties of a position focus and its permissible parent experience formats.

FIG. 8 illustrates the properties of a position focus 403 as a two or three dimensional real number position (point) in the parent experience 101 with its permissible parent experience formats including image experiences 301, map experiences 306, 3D experiences 307, and location experiences 308. A position focus's 403 permissible child experience 101 may be of any format.

Figure 9:
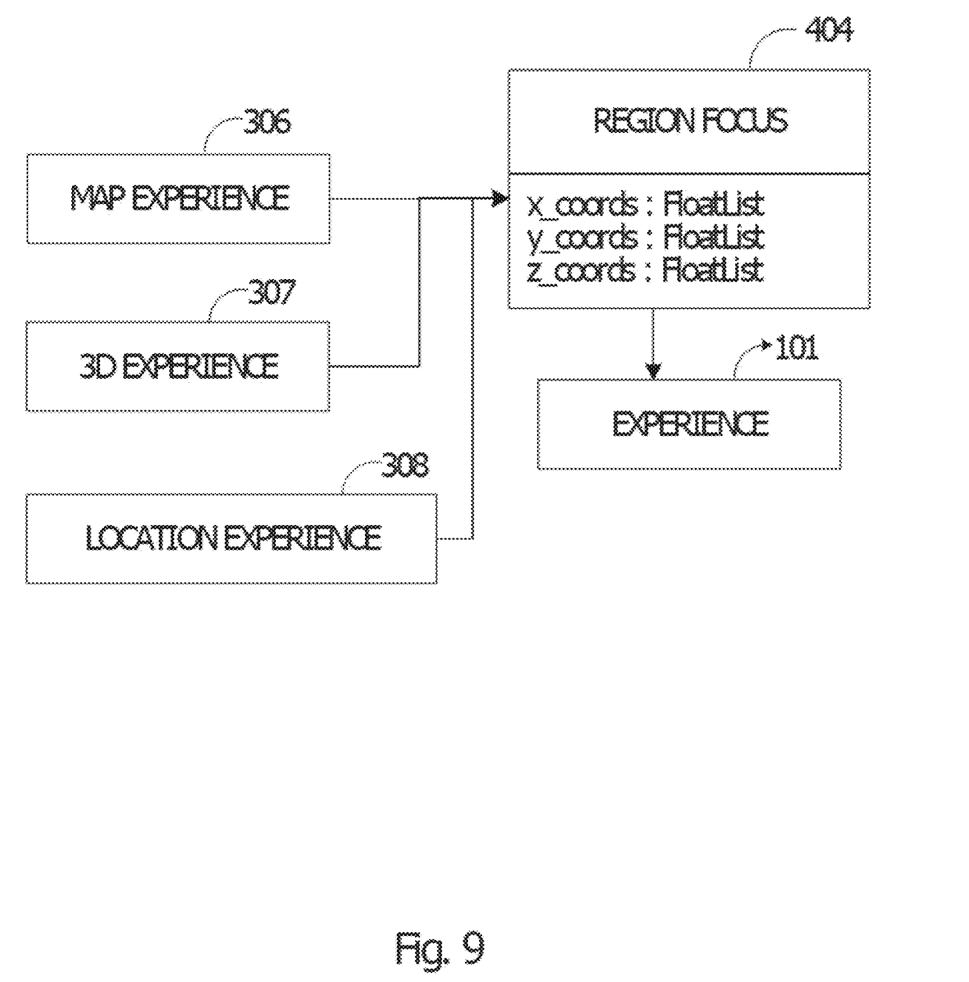
FIG. 9 illustrates example properties of a region focus and its permissible parent experience formats.

FIG. 9 illustrates the properties of a region focus 404 as a series of two or three dimensional real number positions (points) in the parent experience 101 space with its permissible parent experience formats map experiences 306, 3D experiences 307, and location experiences 308. A region focus's 404 permissible child experience 101 may be of any format.

Figure 10:
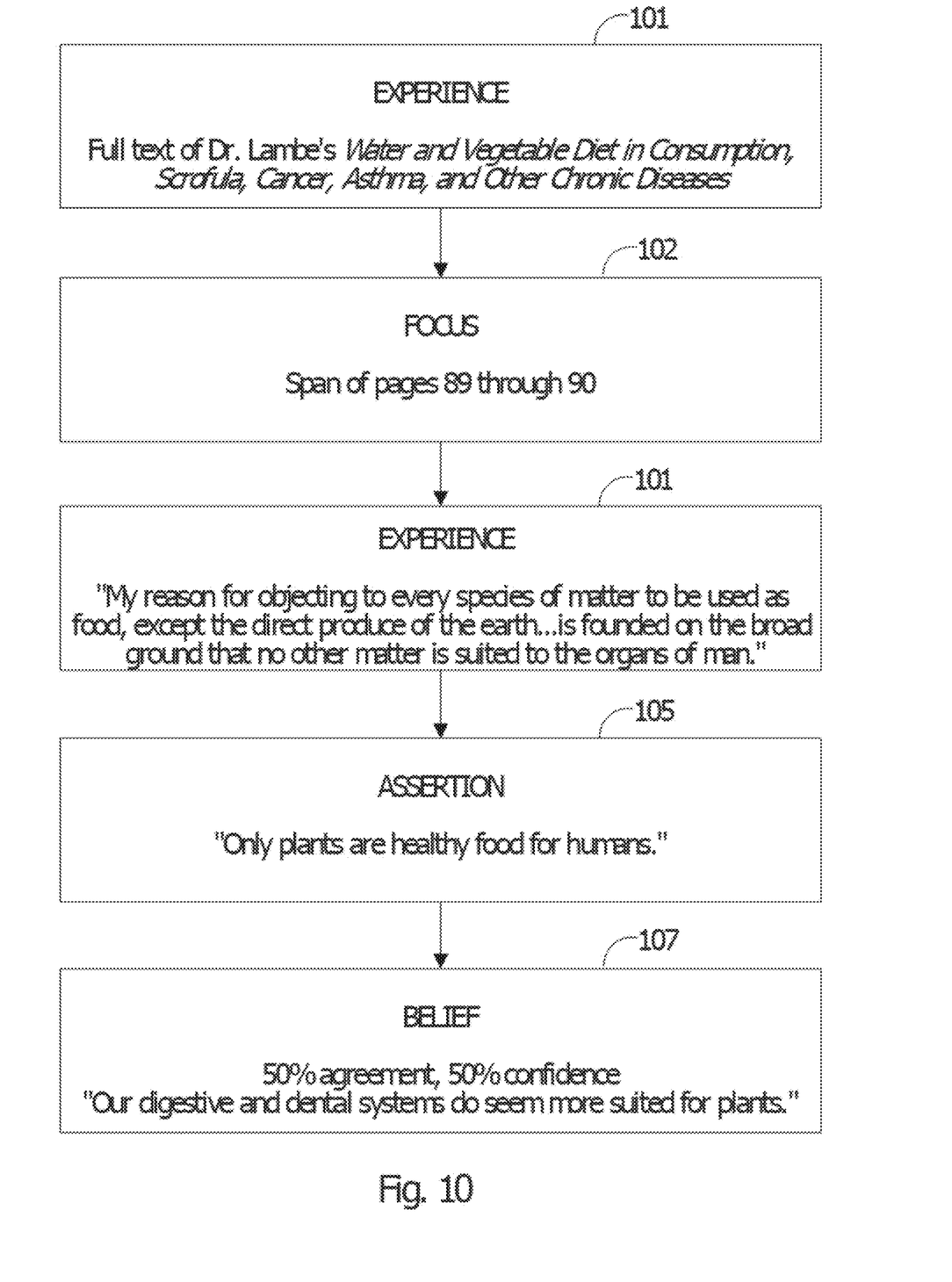
FIG. 10 illustrates components of an example of an experience-focus-experience sequence.

FIG. 10 illustrates the components of an example experience-focus-experience sequence showing a parent experience 101 referencing a book on plant-only dietary practices. A focus 102 links the detail of pages 89 through 90 of that parent experience 101 to a child experience 101 that highlights a quote by the parent experience's 101 author. An assertion 105 about the quote is connected, drawing the conclusion that "only plants are healthy food for humans." This assertion 105 has a belief 107 showing partial agreement and mixed or partial confidence with an explanatory comment.

Figure 11:
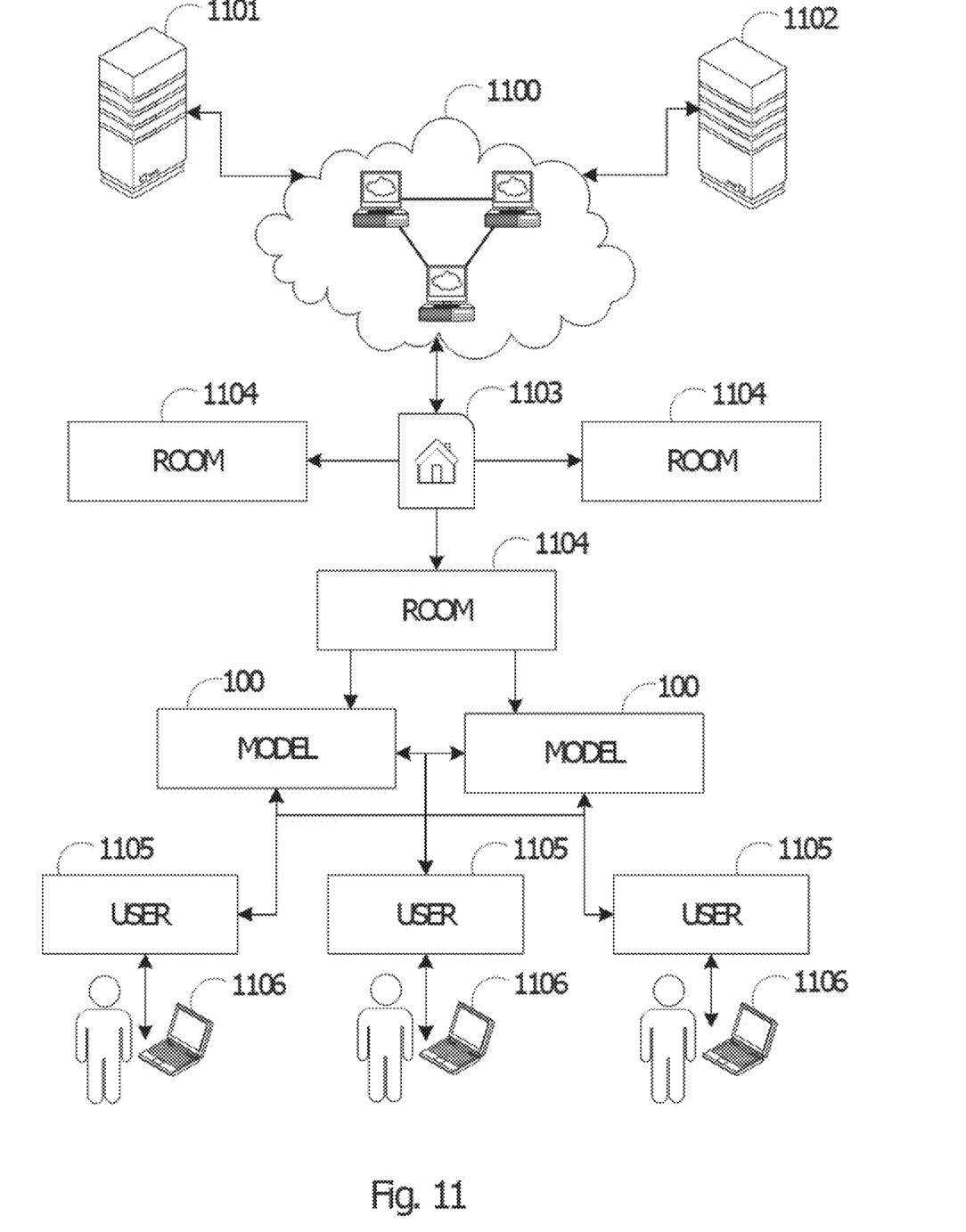
FIG. 11 illustrates an example network relationship of components within an example embodiment of the present disclosure.

FIG. 11 illustrates an example network relationship of components providing a human user 1106 with access to the model 100. The human user 1106 accesses an application 1103 provided by an application server 1101 available on the computer network 1100, causing the application server 1101 to interact with the database server 1102 through the computer network 1100 to provide a gateway to the internal models 100. The client user 1105 joins a named room 1104 which may be shared with other users 1105. The room 1104 the user has joined provides at least one model 100 which then may be concurrently viewed and modified by all the room's 1104 users 1105.

Figure 12:
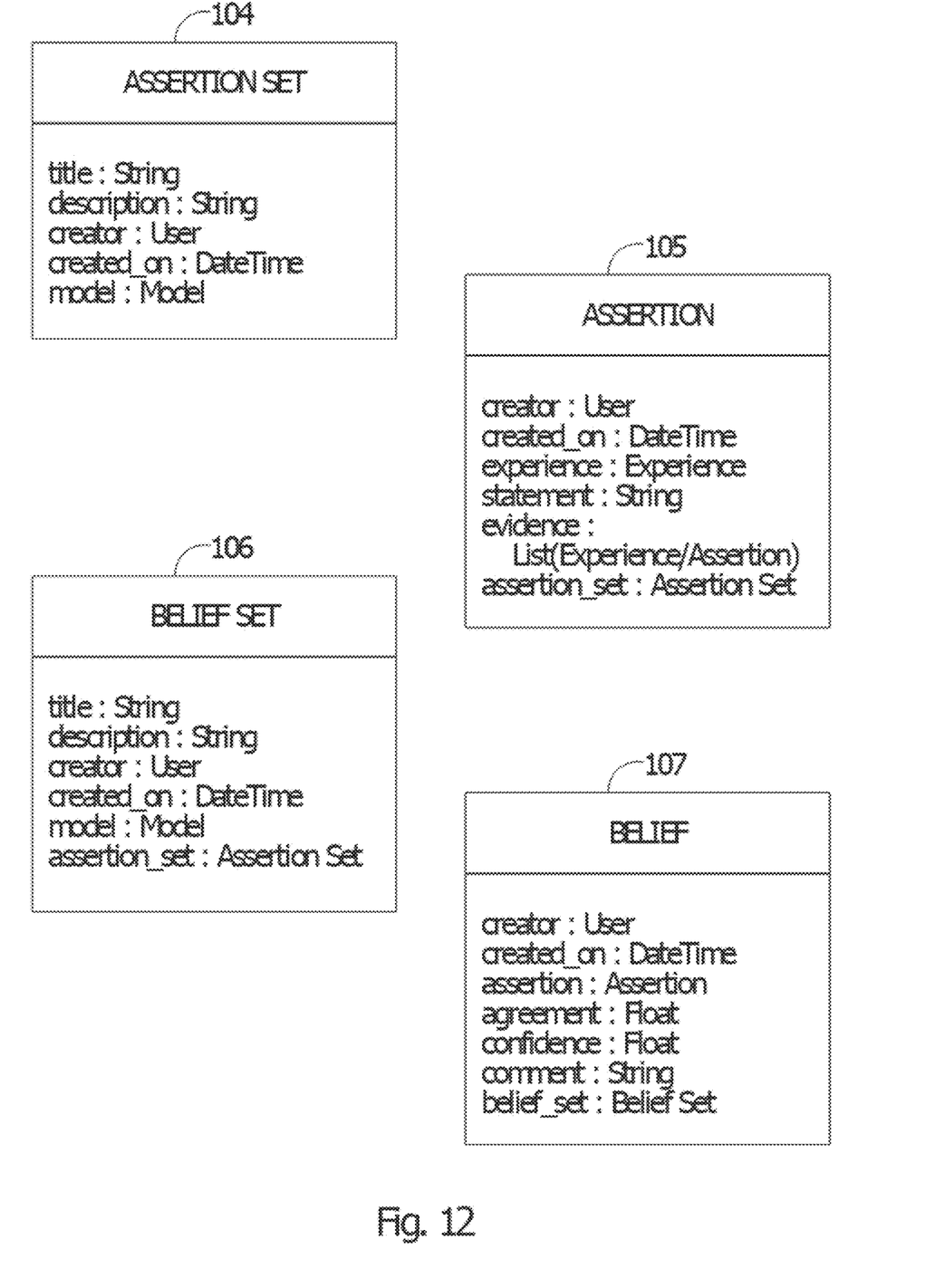
FIG. 12 illustrates the properties of assertion sets, assertions, belief sets, and beliefs.

FIG. 12 illustrates the properties of assertion sets 104, assertions 105, belief sets 106, and beliefs 107. Assertion set 104 properties include its title, description, creating user 1105, creation date and time, and model 100. Assertion 105 properties include its creating user 1105, creation date and time, target experience 101, propositional statement, list of experiences 101 and assertions 105 as additional supporting evidence, and the assertion set 104 to which the assertion 105 belongs. Belief set 106 properties include its title, description, creating user 1105, creation date and time, model 100, and the assertion set 104 to which the belief set 106 belongs. Belief 107 properties include its creating user 1105, creation date and time, target assertion 105, agreement with the assertion 105 as a normalized positive (agreement) or negative (disagreement) magnitude, confidence in the assertion 105 as a normalized positive (certain) or zero (uncertain) magnitude, comment for the creating user's 1105 explanation of their belief, and the belief set 106 to which the belief 107 belongs.

Figure 13:
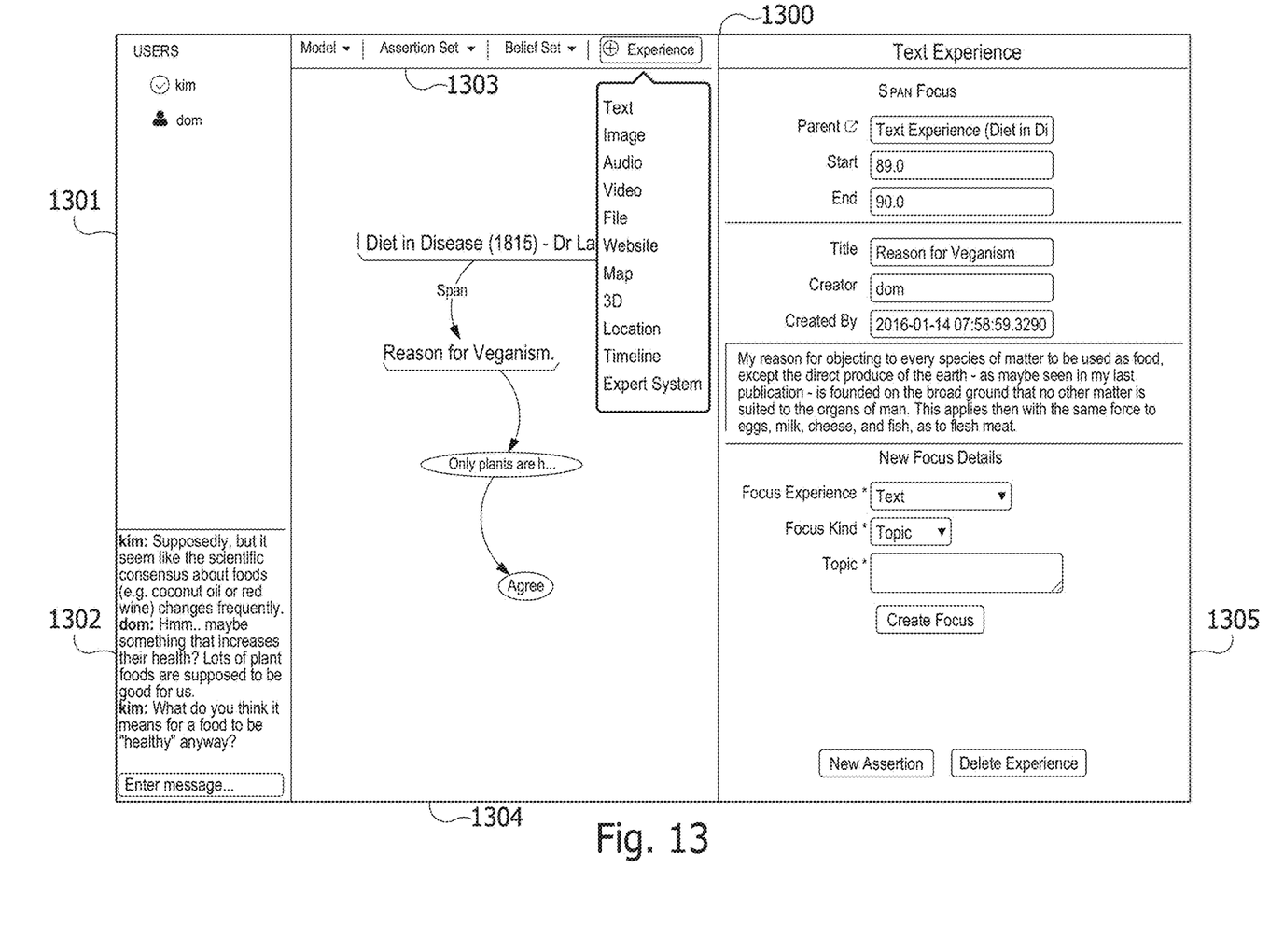
FIG. 13 illustrates an example graphical user interface for interfacing with the invention.

FIG. 13 illustrates an example graphical user interface for interfacing with the invention. The client window 1300 contains a user list 1301 showing the current room's 1104 users 1105. These users may converse with each other through the communication bus 1406 in a noncommittal, ephemeral chat window 1302 that does not get stored with the model 100. A menu bar 1303 provides selection and creation of the model 100, assertion set 104, and belief set 106, as well as the creation of new root experiences 101. The model graph 1304 provides an interactive graphical display of the relationship between model 100 components including experiences 101, focuses 102 (shown as a labelled edge), assertions 105, and beliefs 107. The detail panel 1305 provides an extensive form for viewing and editing specific components. In the example case, the child experience 101 is selected, providing a view into its properties, as well as information on the connecting focus 102 and parent experience 101, and tools for creating new focuses 102 or assertions 105.

Figure 14:
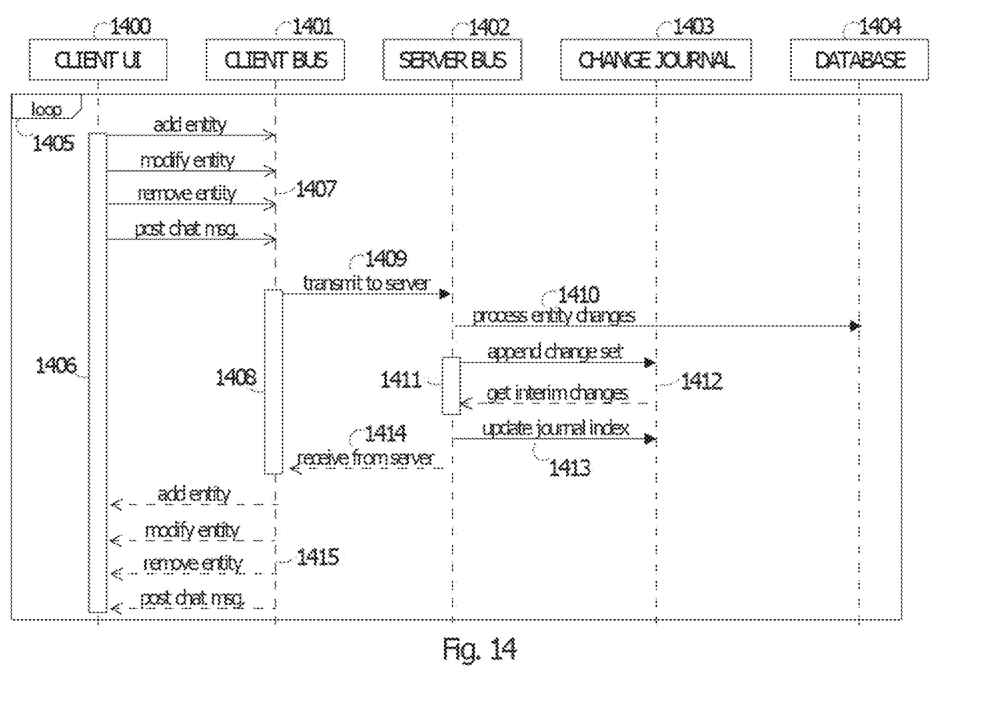
FIG. 14 illustrates the sequence of events in the communication bus.

FIG. 14 illustrates the sequence of events providing communication between the user 1105, the application server 1101, and the database server 1102. The client user interface 1400 may push 1407 entity actions or chat messages for the room as a change set to the client bus 1401 at any time. At a repeated regular polling interval 1405, the client bus 1401 then transmits 1409 all accumulated pending change sets to the application server 1101 over the network 1100. These change sets are then processed 1410 by modifying the entities stored in the database 1404 through remote procedure calls on the database server 1102 over the network 1100. The change set is then appended to the change journal 1412 and all change sets which have been recorded since the client's last bus request 1408 was completed are assembled 1411. The journal head index is advanced 1413 and the interim change sets are returned 1414 to the client bus 1401. These changes are then used to update the user interface elements 1415, completing the client input-output 1406 sequence and the loop 1405 is repeated.

The invention claimed is:

1. A processor-implemented system comprising:
an application provisioned on an application server configured for communications over a computer network;
a database server accessible to the application;
a plurality of client machines operatively configured to access the network and communicate with the application, each client machine including a program providing a GUI for interaction with the application;
the database server storing structured data to implement a digital knowledge model, wherein the model comprises a set of experience entities, a set of assertion entities, and a set of belief entities;
wherein each experience entity conforms to a single, predetermined experience entity set of properties, each assertion entity conforms to a single, predetermined assertion entity set of properties, and each belief entity conforms to a single, predetermined belief entity set of properties;
wherein each set of assertion entities is related as a child of a corresponding individual experience of the set of experience entities;
wherein each set of belief entities is related as a child of a corresponding individual assertion of the set of assertion entities;
wherein the application implements interaction with the client machines for multiple users to concurrently develop the model;
wherein the application is arranged to generate an interactive, graphical user interface display on the client machine to create a model, an assertion set, and a belief set, as well as the creation of new root experience entities;
the graphical user interface display further provides a model graph for interactive graphical display of the relationship among a model's component entities including experience entities, focus entities, assertion entities, and beliefs; and
wherein the application is configured to update the stored model responsive to client machine interactions and update user interface displays so that a user can input a reaction to an update provided by another user;
wherein the experience entity set of properties include its title, creating user, creation date and time, model, format kind, MIME (Multipurpose Internet Mail Extension) type, perceptual content URL (Uniform Resource Locator), "thumbnail" image URL for previewing the content, and a key-value mapping generic properties list;
wherein the experience entity has at least one derivative experience subclass;
and further wherein the derivative experience subclass has a format selected from a group of formats that includes include a text experience which reference a single block of textual characters, image experience which references a single flat bitmap or vector image, audio experience which references a single continuous auditory recording, video experiences which references a single continuous video recording, file experience which references a single computerized file of any type, and website experience which references a single network URL such as for an Internet website.

2. A processor-implemented system comprising:
an application provisioned on an application server configured for communications over a computer network;
a database server accessible to the application;
a plurality of client machines operatively configured to access the network and communicate with the application, each client machine including a program providing a GUI for interaction with the application;
the database server storing structured data to implement a digital knowledge model, wherein the model comprises a set of experience entities, a set of assertion entities, and a set of belief entities;

wherein each experience entity conforms to a single, predetermined experience entity set of properties, each assertion entity conforms to a single, predetermined assertion entity set of properties, and each belief entity conforms to a single, predetermined belief entity set of properties;

wherein each set of assertion entities is related as a child of a corresponding individual experience of the set of experience entities;

wherein each set of belief entities is related as a child of a corresponding individual assertion of the set of assertion entities;

wherein the application implements interaction with the client machines for multiple users to concurrently develop the model;

wherein the application is arranged to generate an interactive, graphical user interface display on the client machine to create a model, an assertion set, and a belief set, as well as the creation of new root experience entities;

the graphical user interface display further provides a model graph for interactive graphical display of the relationship among a model's component entities including experience entities, focus entities, assertion entities, and beliefs; and wherein the application is configured to update the stored model responsive to client machine interactions and update user interface displays so that a user can input a reaction to an update provided by another user; and wherein properties of a focus entity include its creating user, creation date and time, model, format kind, originating parent experience, and dependent child experience.

3. The system according to claim 2, wherein the focus entity has at least one associated derivative focus format that inherits the properties of the focus entity type and defines a specific feature or subset of the focus entity.

4. The system according to claim 3, wherein the derivative focus format is selected from a set of derivative focus formats that includes a topic focus which represents a single textual topic or question of the parent experience, an index focus which represents a single real number index or linear position within the parent experience, a span focus which represents a real number start and end linear positions within the parent experience, a position focus which represents a two or three dimensional real number position within the parent experience 101, and a region focus 404 which represents a two or three dimensional region as a series of two or three dimensional real number positions (points) mapping a manifold surface through its maximum closed extents.

5. A processor-implemented system comprising:
an application provisioned on an application server configured for communications over a computer network;
a database server accessible to the application;
a plurality of client machines operatively configured to access the network and communicate with the application, each client machine including a program providing a GUI for interaction with the application;
the database server storing structured data to implement a digital knowledge model, wherein the model comprises a set of experience entities, a set of assertion entities, and a set of belief entities;
wherein each experience entity conforms to a single, predetermined experience entity set of properties, each assertion entity conforms to a single, predetermined assertion entity set of properties, and each belief entity conforms to a single, predetermined belief entity set of properties;
wherein each set of assertion entities is related as a child of a corresponding individual experience of the set of experience entities;
wherein each set of belief entities is related as a child of a corresponding individual assertion of the set of assertion entities;
wherein the application implements interaction with the client machines for multiple users to concurrently develop the model;
wherein the application is arranged to generate an interactive, graphical user interface display on the client machine to create a model, an assertion set, and a belief set, as well as the creation of new root experience entities;
the graphical user interface display further provides a model graph for interactive graphical display of the relationship among a model's component entities including experience entities, focus entities, assertion entities, and beliefs; and
wherein the application is configured to update the stored model responsive to client machine interactions and update user interface displays so that a user can input a reaction to an update provided by another user; and
wherein the derivative experience subclass has a format including a map experience which references a two-dimensional map.

* * * * *